United States Patent Office 3,132,166
Patented May 5, 1964

3,132,166
ANILINE HEXAFLUOROARSENATE COMPOUNDS
Hugh T. Harrison, Midland, Mich., assignor to The Dow Chemical Company, Midland, Mich., a corporation of Delaware
No Drawing. Filed June 4, 1962, Ser. No. 199,626
1 Claim. (Cl. 260—440)

The present invention is directed to the novel monosalts of hexafluoroarsenic or hexafluorophosphoric acid and aniline or the N-loweralkylanilines wherein loweralkyl represents an alkyl radical containing not in excess of 4 carbon atoms. Representative N-loweralkylanilines to be employed according to the present invention are N-methylaniline, N,N-dipropylaniline, N-butyl-N-methylaniline, N,N-dibutylaniline, and N-isobutylaniline. The present compounds are crystalline materials, of low to moderate solubility in organic solvents and of moderate solubility in water. They are useful as parasiticides, and are adapted to be employed as parasiticides in the control of insects, mites, bacterial and fungal pests, and helminths such as ascarids, pinworms, and tapeworms.

The novel compounds can be prepared by reacting together aniline or an N-loweralkylaniline and hexafluoroarsenic or hexafluorophosphoric acid. Conveniently, the reaction is carried out in an inert liquid reaction medium, such as water. Good results are obtained when substantially equimolecular proportions of the reactants are employed. The reaction is exothermic and takes place smoothly at temperatures of from −10° to 80° C.

In carrying out the reaction, the aniline compound is contacted with the hexafluoroarsenic or hexafluorophosphoric acid in any conventional manner. The contacting is conveniently carried out by adding one reactant to the other reactant. Oftentimes it is convenient to employ a hydrate form of the acid reactant. The temperature of the resulting reaction medium can be controlled by regulating the rate of the contacting of the reactants as well as by external cooling. Sometimes the desired product precipitates in the mixture during the reaction. Where desirable to maintain fluid conditions such product can be separated in part from fluid portions of the mixture by conventional procedures. Upon completion of the contacting of the reactants, most of the reaction will have taken place with the production of the desired product. Where optimum yields are desired, it is often convenient that the reaction mixture be allowed to stand several hours to insure substantial completion of reaction. Upon completion of the reaction, the solvent can be removed from the reaction mixture by evaporation or distillation under reduced pressure to obtain the salt product as a residue. This product can be further purified by conventional procedures such as washing with water or suitable organic liquid and recrystallization.

EXAMPLE 1

*Aniline Hexafluoroarsenate*

35 grams of aniline (0.38 mole) are added portionwise and with stirring to an aqueous 65 percent solution of hexafluoroarsenic acid (equivalent to 65 grams; 0.34 mole of $HAsF_6$). The aqueous $HAsF_6$ solution employed herein and in the following embodiments is a commercial product containing 65 percent $HAsF_6$, 21 percent $H_2O$, and 14 percent related arsenic acids. The addition is carried out at a temperature near to 0° C. and over a period of thirty minutes. Three times during this period the addition is interrupted and the reaction mixture filtered to obtain the aniline hexafluoroarsenate product as a residue. Upon completion of the addition, the reaction mixture is again filtered to obtain additional aniline hexafluoroarsenate product as a residue. The combined product is dried, and found to melt at from 105° to 108° C.

EXAMPLE 2

*N-Sec-Butylaniline Hexafluorophosphate*

23.3 grams of N-sec-butylaniline (0.16 mole) are added portionwise and with stirring to an aqueous 65 percent solution of hexafluorophosphoric acid (equivalent to 32.5 grams; 0.22 mole of $HPF_6$). The aqueous $HPF_6$ solution employed herein and in the following embodiments is a commercial product containing 65 percent $HPF_6$, 21 percent $H_2O$, and 14 percent related phosphorus acids. The first portion of the N-sec-butylaniline (about 9 grams) is added at room temperature and over a period of fifteen minutes; subsequently the reaction mixture is cooled to a temperature near to 0° C. and filtered to obtain the N-sec-butylaniline hexafluorophosphate product as a residue. The second portion of the N-sec-butylaniline (14 grams) is added to the filtrate at a temperature of near to 0° C. and over a period of twenty minutes. The reaction mixture is permitted to stand for a period of thirty minutes at a temperature of 0° C. The resulting mixture is then filtered to obtain additional N-sec-butylaniline hexafluorophosphate product as residue. The combined product is dried and found to melt at from 45° to 50° C.

In a similar manner other products of the present invention are prepared as follows:

N,N-dimethylaniline hexafluorophosphate (molecular weight of 267.2) by reacting together N,N-dimethylaniline and hexafluorophosphoric acid.

N-sec-butylaniline hexafluoroarsenate (melting at from 115° to 116° C.) by reacting together N-sec-butylaniline and hexafluoroarsenic acid.

N-ethyl-N-propylaniline hexafluorophosphate (molecular weight of 309.1) by reacting together N-ethyl-N-propylaniline and hexafluorophosphoric acid.

N - isopropylaniline hexafluoroarsenate (molecular weight of 325.2) by reacting together N-isopropylaniline and hexafluoroarsenic acid.

The present compounds are useful as parasiticides in various insecticidal, nematocidal and antimicrobial compositions. For such use, the unmodified compounds can be employed. However, the present invention also encompasses the use of the compounds together with a parasiticide adjuvant. In such use, the compounds can be dispersed upon a finely divided solid and the resulting preparations employed as dusts. Also, such mixtures can be dispersed in water with the aid of a wetting agent and the resulting aqueous suspensions employed as sprays. In other procedures, the products can be employed as constituents of organic liquid compositions, oil-in-water or water-in-oil emulsions, or water dispersions with or without the addition of wetting, dispersing or emulsifying agents. In representative operations, N-sec-butylaniline hexafluorophosphate gives 100 percent control of tapeworms and pinworms at a concentration of 0.06 percent by weight in animal diets.

The N-loweralkylanilines to be employed as starting materials according to the present invention are prepared in known methods for the alkylation of aniline. Thus for example, aniline is reacted with a dialkyl sulfate, alkyl chloride, or other alkylating agent or successively with two such reagents to introduce one or two alkyl moieties on the aniline nitrogen atom. In an alternate procedure, an alkylamine or dialkylamine compound can be reacted with halobenzene to yield the desired N-lower alkylaniline.

I claim:

The monosalt of hexafluoroarsenic acid and a member of the group consisting of aniline and the N-loweralkylanilines.

References Cited in the file of this patent

UNITED STATES PATENTS

| | | |
|---|---|---|
| 1,917,463 | Salzberg et al. | July 11, 1933 |
| 1,960,712 | Reimers | May 29, 1934 |

OTHER REFERENCES

Fluorine Chemistry, edited by J. H. Simons, vol. I, (1950), pages 138–139, Academic Press, Inc., publishers, New York, N.Y.